Nov. 29, 1955  H. ANDERSON  2,724,984
CUTTING BLADE SHARPENERS
Filed Dec. 26, 1950  2 Sheets-Sheet 1
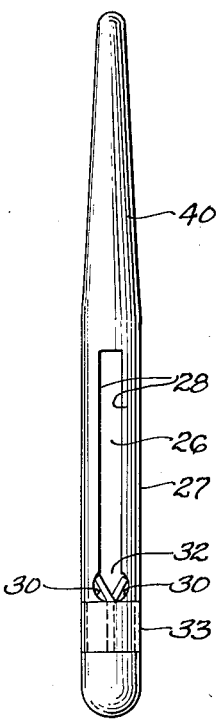
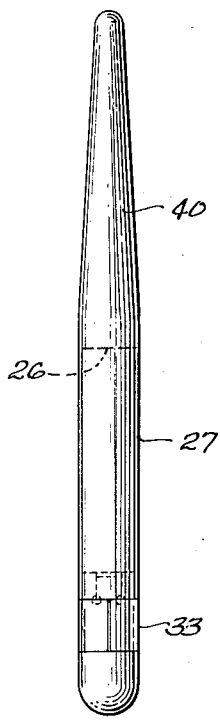
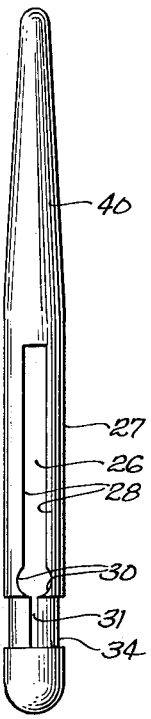
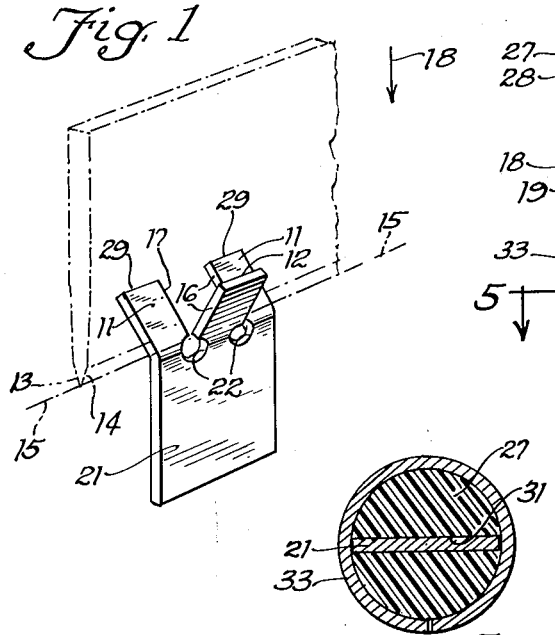
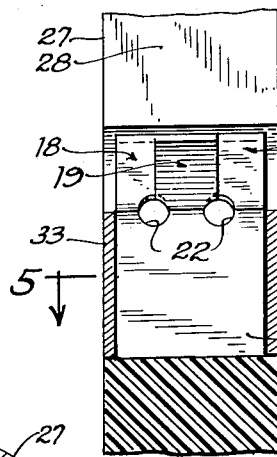
INVENTOR.
Hilding Anderson

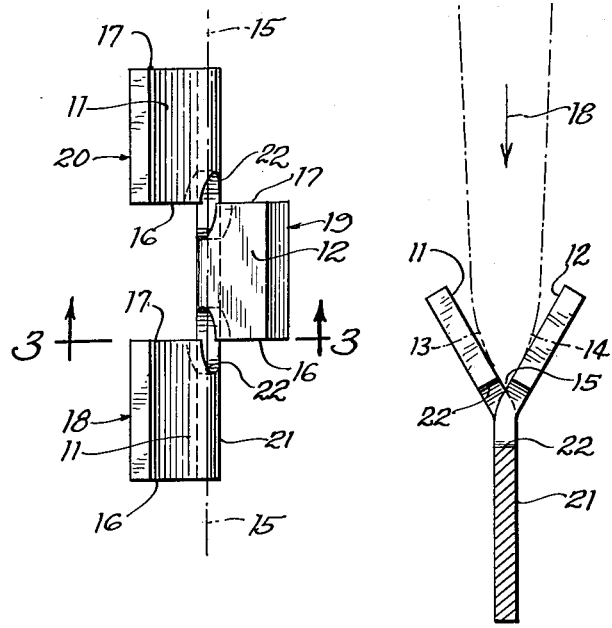
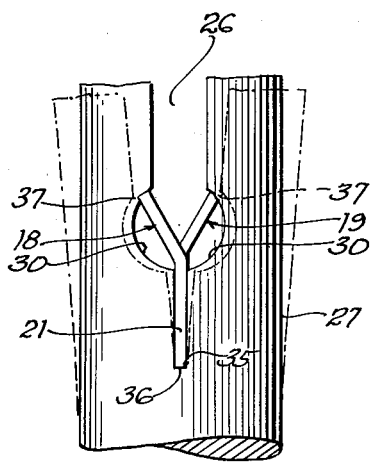
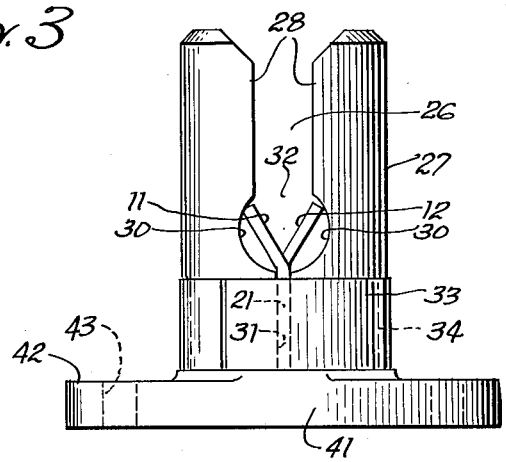
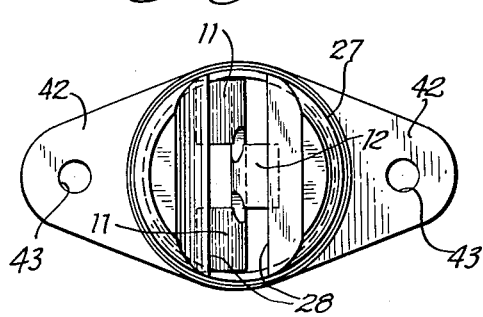

United States Patent Office 2,724,984
Patented Nov. 29, 1955

2,724,984

CUTTING BLADE SHARPENERS

Hilding Anderson, Tinley Park, Ill.

Application December 26, 1950, Serial No. 202,748

4 Claims. (Cl. 76—86)

The present invention relates to cutting blade sharpeners of the type wherein sharpening is accomplished by a metal flow working of the blade edge rather than by abrasive action.

Reference is made to my copending application for United States Patent, Serial Number 106,259, filed July 22, 1949, now abandoned, that discloses a sharpener that is designed to accomplish this type of sharpening, the present invention presenting improvements in that it enables a cutting blade to be more easily maintained in proper alignment with the sharpener, and provides an assembly that is considerably cheaper. The present invention has two aspects, one relating to arrangement of the sharpener itself, that is to say, the device that directly acts on the blade edge to work it into keen condition, the other relating to inexpensive assemblies including such sharpeners and supporting structures for maintaining the sharpeners for convenient and safe use.

In general, sharpeners of the kind in question comprise surfaces that are disposed successively along a blade edge path in alternate opposite inclination and arrangement on opposite sides of the path, for successive rubbing contact with the bevel surfaces of a blade edge drawn through the path. For most effective sharpening, by working of the blade edge to a definite cross sectional shape, the blade-working surfaces must be maintained absolutely rigid against deflection from their relative positions. Additionally, such surfaces must be so arranged and disposed to avoid scraping action on a blade drawn between them. Heretofore, it has been proposed to arrange the surfaces for non-scraping action by curving them in the direction of the blade path. This has resulted in the limitation of the actual working surfaces presented for contact with the blade edge bevel surfaces to very narrow central portions of the surfaces. When the sharpener comprises three or more such surfaces, they tend to deflect the blade between each pair of surfaces that are adjacent on the same side of the path, and this blade deflection results in a scalloped edge formation, particularly in the sharpening of flexible blades of such material as stainless steel, that is tough rather than hard. This blade-scalloping does not result from a single pair of crossed round wires of relatively small diameter, providing rounded blade edge-contacting surface portions that are close together, as disclosed by my above-identified copending application, but a sharpener of that kind requires quite exact maintenance of the blade position relative to the sharpening surfaces, that is to say, a perpendicular relation of the blade edge to the transverse V-shaped path defined between the surface contact portions. Any skewing of the blade from such a perpendicular relation, which occurs readily during careless or unskilled use of the sharpener, tends to wedge the blade edge between adjacent surfaces of the crossed wires, resulting in an unpredictable blade edge cross section and possibly in its abrasion as well.

A primary object of the present invention is the provision of a novel blade edge sharpener element that operates on a blade edge drawn through it, by metal flow working action, to produce a keen, straight edge.

Another object is to provide such a sharpener element arranged in novel manner to maintain proper positional relation between itself and a blade being sharpened, without requiring skillful and careful use by the operator.

Another object is to provide such a sharpener element that is of low cost with respect to material content and manufacturing, and that is capable of ready and secure assembly with various types of inexpensive supporting structures.

An additional object is the provision of a novel type of blade edge sharpener assembly, assemblies of the type being inexpensive, effective, and safe in use, and sufficiently rugged for lengthy service.

In the accompanying drawings:

Fig. 1 is a perspective view of a sharpener element arranged according to the invention, illustrating the manner of its cooperation with a cutting blade.

Fig. 2 is a plan of the sharpening channel side of the element.

Fig. 3 is a transverse section on line 3—3 of Fig. 2.

Fig. 4 is a sectional view through a sharpener assembly arranged in accordance with the invention, showing a side elevation of the sharpener element of the assembly.

Fig. 5 is a cross section on line 5—5 of Fig. 4.

Fig. 6 is a front elevation of a sharpener assembly designed to be held in the hand of an operator during use.

Fig. 7 is a side elevation thereof.

Fig. 8 is a front elevation of the support structure forming a part of the assembly of Figs. 6 and 7.

Fig. 9 is a front elevation of a sharpener assembly designed for securement to a support.

Fig. 10 is a top plan thereof.

Fig. 11 is a fragmentary front elevation disclosing an alternative way of securing a sharpener element in a supporting structure.

The sharpener element, shown in Figs. 1 to 3, provides at least a pair of working surfaces 11, 12, disposed successively along and respectively inclined oppositely to define a channel along which a cutting blade edge may be drawn with its opposite bevel surfaces 13, 14 rubbing over the respective surfaces 11, 12. The surfaces 11, 12 are so arranged that each of them crosses a single axis 15 that corresponds to the line of travel of a blade-cutting edge that has a cross section perfectly matching the V-shape of the channel. Surfaces 11, 12, at least throughout portions extended in the directions of blade travel from the adjacent margins 16, 17 of adjacent surfaces 11, 12, are extended in the directions of blade travel along lines that are straight and parallel to axis 15. At no point intermediate their leading and trailing margins do the surfaces extend into the channel beyond straight lines extended between such lines and parallel to axis 15. This surface arrangement avoids all tendency to transversely deflect a blade, pressed against the surfaces as suggested by arrow 18 of Figs. 1 and 3. As a consequence, the fore and aft margins 16, 17 of the various surfaces may be defined by sharp corners, without danger of scraping blade edge bevel surfaces. Advantageously, the sharpener has three surfaces 11, 12, since the alternate arrangement of two surfaces at one side of the channel and an intervening surface to the other side thereof provide for proper alignment of a blade edge with axis 15, and proper contact of its bevel surfaces, as 13, 14, with surfaces 11, 12, without exercise of particular care or skill by an operator. Additionally, for ready manufacture, surfaces 11, 12 preferably are completely flat, and all of the surfaces on one side of the channel, as surfaces 11, lying along a common plane, and the planes of all surfaces extending along and crossing the single axis 15.

As suggested above, for proper functioning of a sharpener having surfaces arranged as so far described, such surfaces must be maintained rigid in their proper relative positions, as freedom to yield under blade pressure will result in an unpredictable blade edge cross section, and probably in blade abrasion. For these reasons the surfaces 11, 12 are provided by members 18, 19, 20 are are rigidly positioned relative to one another to maintain the working surfaces 11, 12 in proper relation. For manufacturing simplicity and economy, members 18, 19, 20 preferably are integral members of a unitary element. This element may be formed from a single plate-like blank, by a shearing and bending operation. The element, in addition to members 18, 19, 20 includes a body member 21 with an edge portion of which members 18, 19, 20 merge. Surfaces 11, 12 of the respective members may be made to accurately cross the common axis 15 by weakening the blank, prior to bending the members, by holes 22 through the blank and centered on the intended axis.

The sharpener element described above may be mounted in an inexpensive supporting structure which may be of some such readily formed material as wood or artificial plastic. Such supporting structure is provided with a slot 26 extended transversely through a body portion 27 thereof, and that is defined by opposed, preferably parallel flat internal surfaces 28 that serve as side guides for a blade during its sharpening. The Y-shaped sharpener element is mounted with the V-shaped sharpening channel formed by its working surfaces 11, 12 extended through slot 26, and preferably with the margins 29 at its surfaces 11, 12 flush with the slot-defining surfaces 28. To permit this flush relation, the respective internal surfaces 28 are provided with opposite recesses 30 wherein marginal portions of the sharpener element members 18, 20 and 19 respectively are received. Sharpener element leg or body member 21 is received in a slot 31 of matching width, which may be considered as a narrow extension of slot 26 beyond recesses 30. By this arrangement, the throat 32 of the sharpener element channel is registered with and forms an end of the blade guiding slot 26.

The sharpener element may be secured in the supporting body 27 in a variety of ways, one of which is shown in Figs. 4 to 10, another in Fig. 11. In the first of these, a portion of body 27 surrounding at least portions of slot extension 31, and of sharpener element leg member 21, is encircled by a ring 33. Conveniently, ring 33 is a resilient split ring engaged in a peripheral recess 34 (see Fig. 8) of the support body 27.

In the arrangement of Fig. 11, recesses 30 are so shaped and dimensioned relative to sharpener element members 18, 19, 20, and the position of the end wall 35, 36 is so arranged relative to the end surface 36 of sharpener element 21, that the surfaces of recesses 30 exert pressure against one or more of the outer corners 37 of members 18, 19, 20. Assembly is made by forcing open slot 26, as suggested by the dotted lines, inserting the sharpener element, and releasing the body to return, thereby coming into the described pressure-exerting relation to the sharpener element. Corners 37 may bite into the material of the body. In any event, a firm gripping relation exists, and it is adequate to maintain the assembly.

The supporting structure may take a variety of forms, depending on the particular service for which the assembly is intended. The structure of Figs. 6 to 8 is intended to be held in one hand of an operator while the blade is drawn through slot 26 by the operator's other hand. A handle portion 40 extends from body portion 27, beyond the end of slot 28 opposite that formed by the channel of the sharpening element. By this arrangement, during sharpening of a blade its edge is directed away from the hand of an operator grasping handle 40.

The assembly of Figs. 9 and 10 is intended for mounting on a supporting surface. In this assembly a foot portion 41 extends from body portion 27 beyond the sharpener element. This foot portion may be provided with flanges 42 having screw holes 43 for fastening the assembly to a support.

From the foregoing it will be apparent that the invention may be practiced in many ways other than by the specific forms disclosed, and, consequently, it will be understood that the scope of the invention is determined solely by the appended claims.

I claim:

1. A sharpener for cutting blades, comprising an elongate body providing a handle part extended from a first one of its ends, said body having therethrough at a location between its ends and spaced from its said first end a slot extended transversely through said body and having a blade body-receiving reach extended axially along said body and defined between opposite internal body surfaces providing cutting blade side guides, said body being provided with a pair of recesses opening oppositely through the respective said internal surfaces in spaced relation to the end of the slot adjacent said handle portion, and said body having a slot reach extended beyond said recesses, and a rigid metal Y-shaped sharpener element having marginal portions of its arm members respectively engaged in said recesses and its leg member engaged in said extended slot reach.

2. A cutting blade sharpener, according to claim 1, wherein the leg member of said sharpener element has opposite edge surfaces substantially flush with opposite external surfaces of said body, and including a keeper member surrounding said body and overlying opposite edge surfaces of said leg member.

3. A cutting blade sharpener, according to claim 1, wherein said body is of molded artificial material.

4. A cutting blade sharpener, according to claim 1, wherein said body is of molded artificial material, said sharpener element leg member has opposite edge surfaces substantially flush with opposite external surfaces of said body, and a resilient metal band surrounds said body and overlies said opposite edge surfaces.

References Cited in the file of this patent

UNITED STATES PATENTS

| 1,083,490 | Haywood | Jan. 6, 1914 |

FOREIGN PATENTS

| 512,326 | Great Britain | Sept. 1, 1939 |